(12) United States Patent
Lee et al.

(10) Patent No.: US 7,442,916 B2
(45) Date of Patent: Oct. 28, 2008

(54) LIFT DETECTION ADAPTED FOR NAVIGATION ON A TRANSPARENT STRUCTURE

(75) Inventors: Wui Pin Lee, Penang (MY); Sal Mun Lee, Penang (MY)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 77 days.

(21) Appl. No.: 11/510,103

(22) Filed: Aug. 25, 2006

(65) Prior Publication Data

US 2008/0061219 A1    Mar. 13, 2008

(51) Int. Cl.
*H01J 40/14* (2006.01)
(52) U.S. Cl. .................................. 250/221; 250/559.38
(58) Field of Classification Search .................. 250/221, 250/559.29, 559.38, 239, 214 R, 205; 345/157, 345/161, 163, 166; 356/399–402
See application file for complete search history.

(56) References Cited

U.S. PATENT DOCUMENTS

| | | | |
|---|---|---|---|
| 5,644,139 A | 7/1997 | Allen et al. | |
| 6,222,174 B1 | 4/2001 | Tullis et al. | |
| 6,281,882 B1 | 8/2001 | Gordon et al. | |
| 6,433,780 B1 | 8/2002 | Gordon et al. | |
| 7,189,985 B2 * | 3/2007 | Xie et al. | 250/559.29 |
| 2004/0189593 A1 | 9/2004 | Koay | |
| 2007/0013661 A1 * | 1/2007 | Theytaz et al. | 345/166 |
| 2007/0291001 A1 * | 12/2007 | Trisnadi et al. | 345/166 |

* cited by examiner

*Primary Examiner*—Que T Le

(57) ABSTRACT

A pointing device such as an optical mouse is equipped with a top surface lift detection system that is able to provide lift detection whether the pointing device sits on a transparent structure or on an opaque structure. The top surface lift detection system relies on the separate detection of a light beam that reflects off the surface upon which the pointing device sits to detect lift whether the pointing devices sits on an opaque surface or a transparent surface.

16 Claims, 3 Drawing Sheets

US 7,442,916 B2

LIFT DETECTION ADAPTED FOR NAVIGATION ON A TRANSPARENT STRUCTURE

BACKGROUND OF THE INVENTION

An optical navigation device, such as an optical mouse, typically includes an optical navigation sensor integrated circuit (IC) that functions as a miniature digital camera to continually collect images of a surface that the device is sitting on and to determine the speed and direction that the device is being moved across the surface by comparing sequentially recorded frames of image information. Image frames are collected at a very high rate, such as 1,500 image frames per second, and the resolution of the optical navigation sensor IC is high enough to detect very small movements of the device relative to the navigation surface.

With an optical navigation device such as an optical mouse, there is a need to recognize when the device has been lifted off the navigation surface. This is important because the act of lifting the device off the navigation surface indicates that the user wants navigation tracking to be temporarily suspended. Detecting lift off when navigating on an opaque surface is typically done by processing the image information that is generated by the navigation sensor IC.

Sometimes an optical navigation device is used on a transparent structure such as a glass plate that covers a desktop. One technique for enabling an optical navigation device to navigate on a transparent structure as well as an opaque structure involves eliminating the navigation device's focusing optics. While an optical navigation device can be configured to support navigation tracking on both transparent and opaque structures without focusing optics, elimination of the focusing optics renders conventional lift detection techniques ineffective over the distances required for practical lift detection, e.g., less than about 10 mm.

Therefore, what is needed is a lift detection technique that is effective on a navigation surface whether the navigation surface is on a transparent structure such as a glass plate or an opaque structure such as a desktop.

SUMMARY OF THE INVENTION

A pointing device such as an optical mouse is equipped with a top surface lift detection system that is able to provide lift detection whether the pointing device sits on a transparent structure or on an opaque structure. The top surface lift detection system relies on the separate detection of a beam that reflects off the surface upon which the pointing device sits to detect lift whether the pointing device sits on an opaque structure or a transparent structure. In an embodiment, the top surface lift detection system includes a photodetector that is dedicated to the lift detection and separate from an image sensor array that is used for navigation tracking.

In an embodiment, the pointing device is equipped with both a top surface lift detection system and an navigation sensor lift detection system. The navigation sensor lift detection system generates a lift status signal in response to image information from a navigation sensor array and the top surface lift detection system generates a lift status signal in response to detection of a beam that reflects off the surface upon which the pointing device sits whether the pointing device sits on an opaque structure or a transparent structure. In an embodiment, the top surface lift detection system is used to control lift detection for navigation purposes and the navigation sensor lift detection system is used to control certain components of the navigation system. For example, the light source can be powered down or turned off when the navigation sensor lift detection system indicates that the pointing device has been lifted.

Other aspects and advantages of the present invention will become apparent from the following detailed description, taken in conjunction with the accompanying drawings, illustrating by way of example the principles of the invention.

BRIEF DESCRIPTION OF THE DRAWINGS

Throughout the description similar reference numbers may be used to identify similar elements.

DETAILED DESCRIPTION OF THE INVENTION

A pointing device such as an optical mouse is equipped with a top surface lift detection system that is able to provide lift detection whether the pointing device sits on a transparent structure or on an opaque structure. The top surface lift detection system relies on the separate detection of a beam that reflects off the surface upon which the pointing device sits to detect lift whether the pointing device sits on an opaque structure or a transparent structure.

Figure 1:
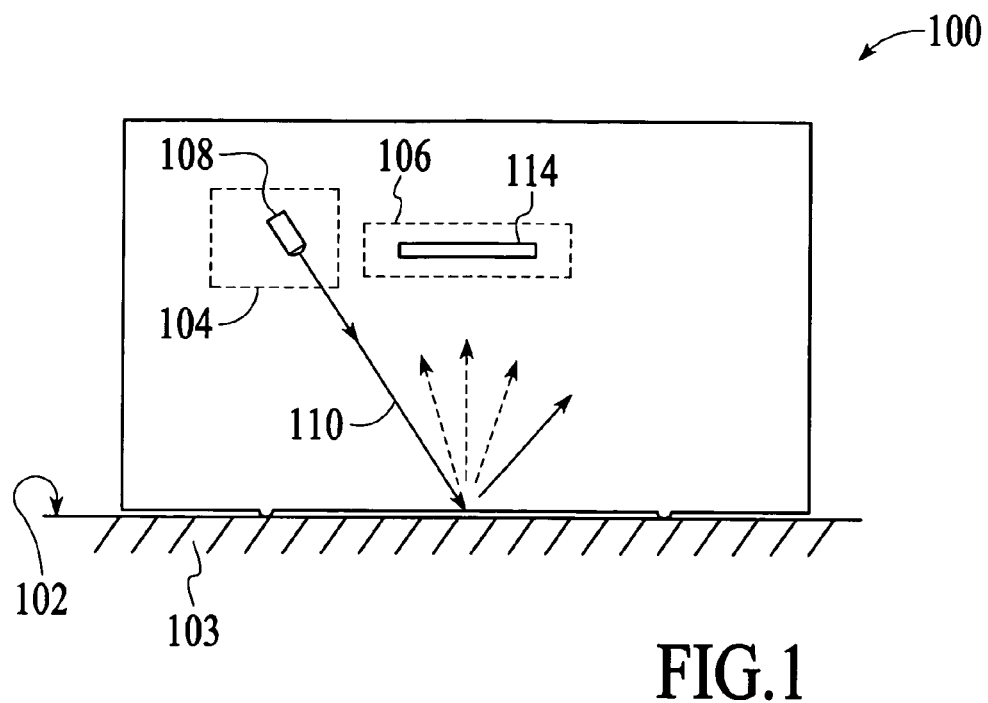
FIG. 1 is a cross-sectional view of an optical navigation device, referred to generally herein as a "pointing device," which sits on and moves over an opaque surface.

FIG. 1 is a cross-sectional view of an optical navigation device 100, referred to generally herein as a "pointing device," which sits on and moves over the surface 102 of an opaque structure 103 such as a desktop. For purposes of this description, the pointing device may be viewed as having two principal components, an illumination system 104 and a navigation sensor system 106. The illumination system typically includes a light source 108 such as a light emitting diode (LED) and some optics (not shown), which together operate to illuminate a spot on the surface of the opaque structure with collimated light 110 that strikes the surface at a shallow angle. Light from the illuminated spot on the surface is detected by an optical navigation sensor IC 114 of the navigation sensor system. In an embodiment, the optical navigation sensor IC includes an array of distinct photodetectors (not shown), for example, a 16×16 or 32×32 array of distinct photodetectors configured to detect light that is reflected from the illuminated spot on the top surface. Each of the photodetectors in the array generates light intensity information that is output as a digital value (e.g., an 8-bit digital value). Image information is captured in frames, where a frame of image information includes a set of simultaneously captured values for each distinct photodetector in the array. Image frames captured by the image sensor include data that represents features on the navigation surface. The rate of image frame capture is programmable and, for example, ranges up to 2,300 frames per second. In an embodiment, the photodetector array has a resolution of 800 characters per inch (cpi).

The optical navigation sensor IC 114 also includes a navigation engine (not shown) which compares successive image frames to determine the movement of image features between frames. In particular, the navigation engine determines movement by correlating common features that exist in successive image frames. The movement between image frames is expressed in terms of movement vectors in, for example, X and Y directions (e.g., ΔX and ΔY). The movement vectors are then used to determine the movement of the optical navigation sensor IC relative to the navigation surface (e.g., the top surface 102 of the opaque structure 103). More detailed descriptions of exemplary navigation sensor movement tracking techniques are provided in U.S. Pat. No. 5,644,139, entitled NAVIGATION TECHNIQUE FOR DETECTING MOVEMENT OF NAVIGATION SENSORS RELATIVE TO AN OBJECT, and U.S. Pat. No. 6,222,174, entitled METHOD OF CORRELATING IMMEDIATELY ACQUIRED AND PREVIOUSLY STORED FEATURE INFORMATION FOR MOTION SENSING, both of which are incorporated by reference herein.

In conventional optical pointing devices, the image information that is collected by the optical navigation sensor IC 114 is also used for lift detection. Conventional navigation sensor-based lift detection techniques that utilize the collected image information to detect lift include surface feature analysis and histogram analysis. For example, surface feature analysis involves comparing the number of detected surface features to a feature threshold and detecting lift when the number of detected surface features drops below the feature threshold.

Figure 2:
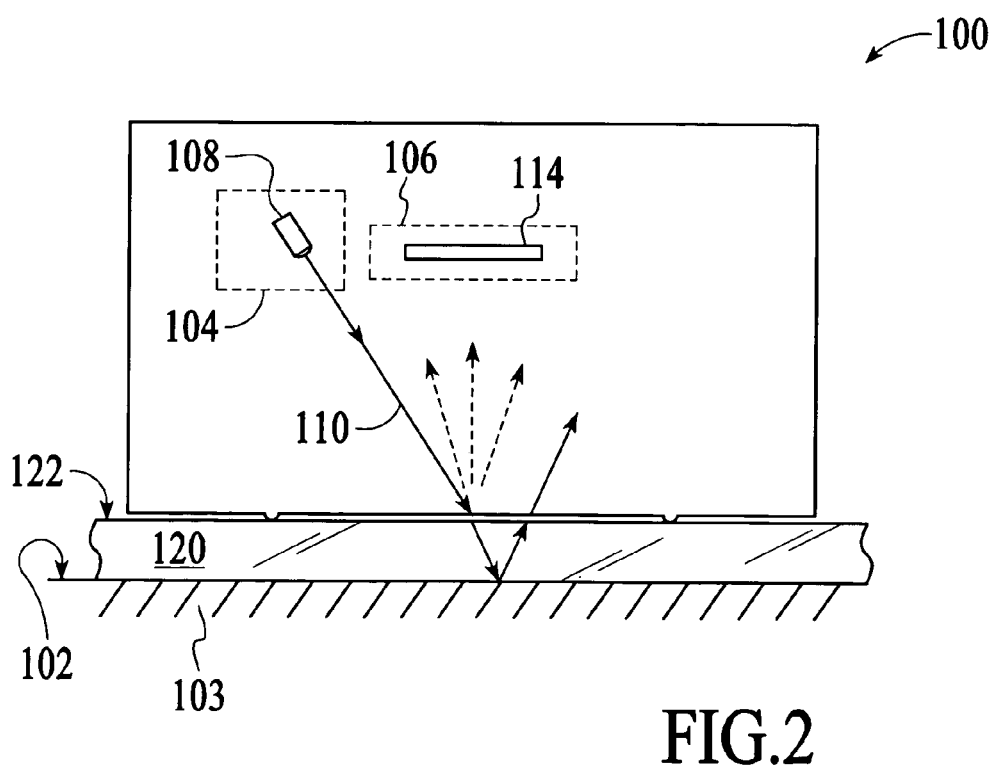
FIG. 2 is a cross-sectional view of the pointing device from FIG. 1 with the pointing device sitting on a transparent structure that is between the pointing device and the opaque surface instead of directly on the opaque surface as is the case in FIG. 1.

A pointing device may also be used on a transparent structure such as a glass plate that sits on top of an opaque structure such as a desktop. FIG. 2 is a cross-sectional view of the pointing device 100 from FIG. 1 with the pointing device sitting on a surface 122 of a transparent structure 120 that is between the pointing device and the opaque structure 103 instead of directly on the opaque structure as is the case in FIG. 1. Transparent structures such as glass plates are often used as protective coverings on desktops or as stand alone table tops. Because the pointing device sits on the transparent structure, some of the light 110 from the light source 108 is refracted into the transparent structure and illuminates the opaque structure under the transparent structure. The light within the transparent structure is then reflected back toward the pointing device and the illuminated spot on the opaque structure is shifted laterally and vertically relative to the spot that was illuminated in the absence of the transparent plate (FIG. 1). The light that is reflected from the opaque structure is used by the navigation sensor system 106 for navigation tracking. Because of the reflective properties of the transparent structure, when the pointing device sits on the transparent structure, the optical navigation sensor IC has a difficult time generating image information that is sufficient for lift detection within the distances required for practical lift detection, e.g., within about 10 mm from the navigation surface.

Various techniques have been developed to enable navigation tracking when the pointing device 100 sits on a transparent structure 120 that is between the pointing device and the opaque structure. One exemplary technique is described in the published U.S. Patent application entitled "OPTICAL MOUSE ADAPTED FOR USE ON GLASS SURFACES," (U.S. Publ. No. 2004/0189593 A1), which is incorporated by reference herein. Although techniques have been developed to enable navigation tracking when the pointing device sits on a transparent structure that is between the pointing device and the opaque structure, these techniques do not provide a solution to the problem of lift detection.

Figure 3:
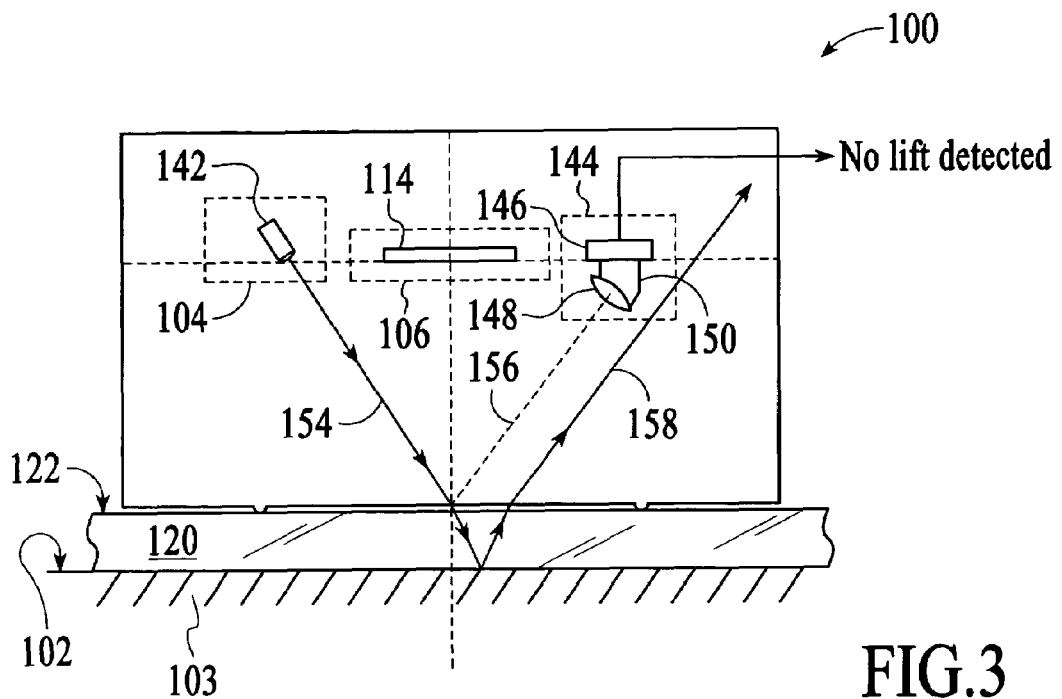
FIG. 3 depicts an embodiment of a pointing device that includes a top surface lift detection system and that is sitting on a transparent structure such as a glass plate.

In accordance with an embodiment of the invention, a pointing device such as an optical mouse is equipped with a top surface lift detection system that is able to provide lift detection whether the pointing device sits on a transparent structure or on an opaque structure. The top surface lift detection system relies on the separate detection of a beam that reflects off the surface upon which the pointing device sits (i.e., the "top" surface) to detect lift. FIG. 3 depicts an embodiment of an optical pointing device that is configured to achieve practical lift detection when the pointing device sits on a transparent structure. The pointing device includes a light system 104, a navigation sensor system 106, and a top surface lift detection system 144. The light system includes at least one light source 142 such as an LED or a laser light source and may include multiple light sources for both lift detection and navigation tracking. The navigation sensor system is similar to the system described above and the top surface lift detection system includes a lift detection detector 146 that is dedicated to lift detection and optics such as a lens 148 and a light guide 150. The light source and top surface lift detection system are configured and positioned relative to each other and relative to the transparent structure upon which the pointing device sits such that a beam of light emitted from the light source that reflects off the top surface is incident on the top surface lift detection system and particularly the system's lift detection detector when the pointing device sits on the top surface. Referring to FIG. 3, a beam of light 154 is emitted from the light source and light beam 156 is reflected off the top surface of the transparent structure towards the top surface light detection system. The light source and top surface light detection system are also configured such that the main beam of light that passes through the transparent structure and reflects off the opaque structure 103 is not incident on the top surface lift detection system. Referring to FIG. 3, the main beam of light 158 that passes through the transparent structure and reflects off the opaque structure is not incident on the top surface lift detection system when the pointing device sits on the top surface.

As described above, FIG. 3 illustrates the case where the pointing device 100 is sitting on the transparent structure 120. That is, the case in which the pointing device is not lifted. In the case where the pointing device is sitting on the transparent plate, the top surface lift detection system and light source are configured such that the light reflected from the top surface 122 of the transparent structure is incident on the top surface lift detection system 144 and detected by the lift detection detector 146. The detection of the reflected light is translated into a signal that indicates that the pointing device is not lifted from the navigation surface.

Figure 4:
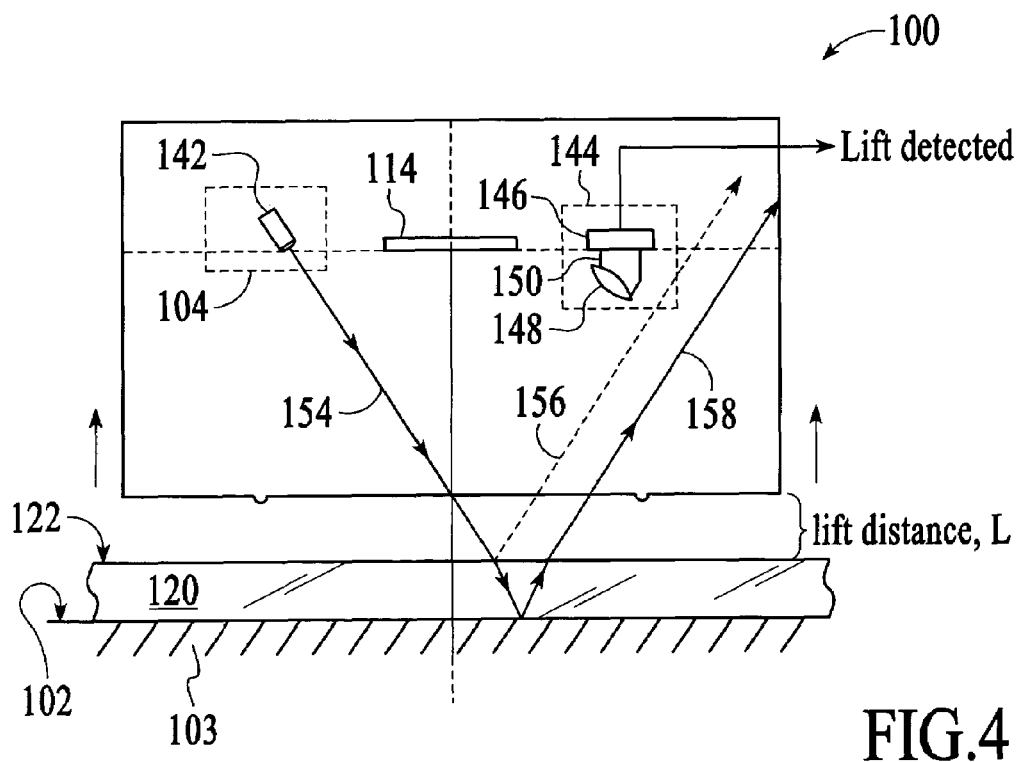
FIG. 4 illustrates the pointing device from FIG. 3 in the case where the pointing device has been lifted off the transparent structure.

FIG. 4 illustrates the pointing device 100 from FIG. 3 in the case where the pointing device is not sitting on the navigation surface, e.g., the pointing device has been 'lifted' off of the transparent structure 120 to a lift distance, L. As a result of the configuration of the top surface lift detection system and the light source and the pointing device being lifted from the navigation surface, the dimensions of the light path change enough that the beam of light 156 is no longer incident on the top surface lift detection system 144. Because the beam of light 156 is no longer incident on the top surface lift detection system, the output signal from the lift detection detector 146 changes, thereby indicating that the pointing device is lifted from the navigation surface. The lift distance at which light is no longer incident on the lift detection sensor system is configurable. Parameters that can be manipulated to affect the distance at which lift is detected include the positioning of the top surface lift detection system and the light source relative to each other, the optics dimensions, the angle of the incident light, etc.

In the embodiment of FIGS. 3 and 4, the top surface lift detection system 144 outputs a signal that indicates the lift status of the pointing device 100 and in other embodiments, the top surface lift detection system outputs a photodetector output signal (e.g., as current or voltage) that is subsequently evaluated to determine the lift status. It should be noted that the top surface lift detection system works the same whether the top surface (i.e., the surface upon which the pointing device sits) is the surface of a transparent structure or an opaque structure.

In an embodiment, the lift detection detector 146 is a single photodetector and in another embodiment, the lift detection detector is a sensor array such as the sensor array that is included in the optical navigation sensor IC 114 from FIG. 1. When a sensor array is used for lift detection, image information generated by the sensor array is processed to detect lift. Further, the processing of image information is used for lift detection only and not for navigation tracking. For example, the optical navigation sensor IC is dedicated to lift detection and the navigation tracking functions associated with the optical navigation sensor IC are disabled or ignored.

Conventional optical navigation devices often include an optical navigation sensor IC that includes a navigation sensor array for generating image information, a navigation engine for generating navigation information from the image information, and a navigation sensor lift detection system that utilizes image information from the navigation sensor array to detect lift. Although conventional optical navigation sensor ICs are able to detect lift, the pointing device should be able to effectively detect lift whether the pointing device is used directly on an opaque structure or on a transparent structure such as a glass plate.

In accordance with an embodiment of the invention, a pointing device is configured with both a navigation sensor lift detection system and a top surface lift detection system. The navigation sensor lift detection system generates a lift status signal in response to image information from the navigation sensor array and the top surface lift detection system generates a lift status signal in response to detection of a beam that reflects off the surface upon which the pointing device sits. The pointing device can be equipped with logic to control the operation of the navigation system in response to the two lift status signals.

Figure 5:
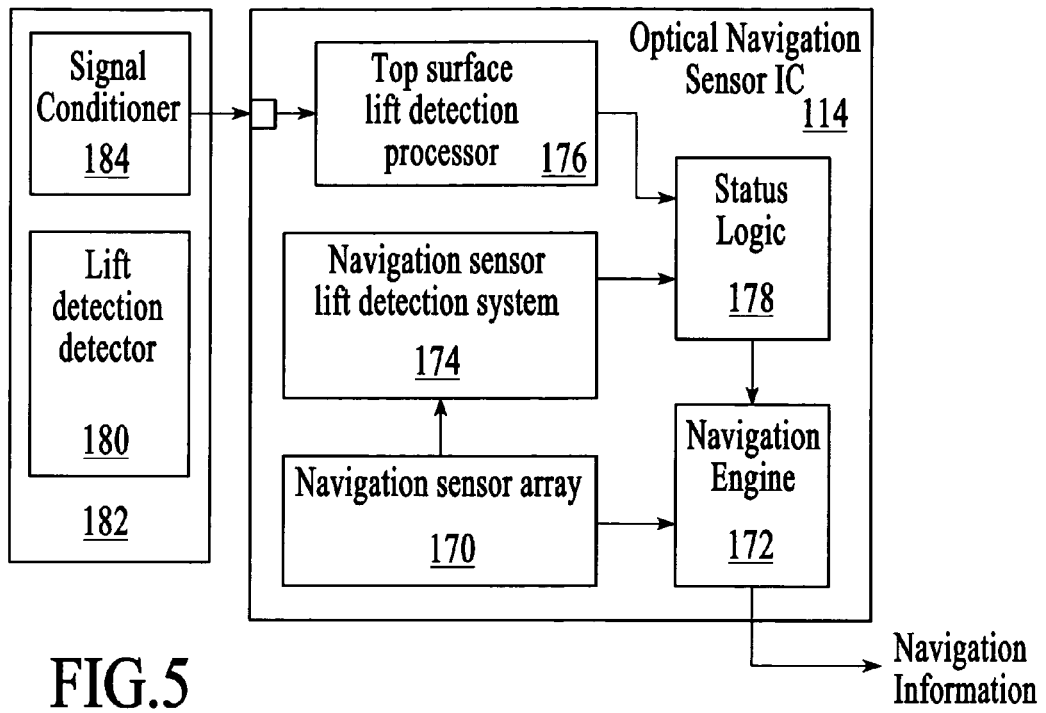
FIG. 5 depicts an embodiment of an optical navigation sensor IC that includes a top surface lift detection system incorporated into the IC.

FIG. 5 depicts an embodiment of an optical navigation sensor IC 114 that includes a portion of a top surface lift detection system incorporated into the IC. The optical navigation sensor IC includes a navigation sensor array 170, a navigation engine 172, an navigation sensor lift detection system 174, a top surface lift detection processor 176, and status logic 178. The navigation sensor array generates image information related to the navigation surface as described above. The image information, typically generated as image frames, is used by the navigation engine as described above to generate navigation information, e.g., displacement in the X and Y directions.

The navigation sensor lift detection system 174 receives image information from the navigation sensor array 170 and generates a lift status signal in response. The opaque surface lift detection system uses any conventional navigation sensor technique to generate the lift status signal. Some exemplary navigation sensor techniques include but are not limited to surface feature analysis and histogram analysis. The particular navigation sensor technique used to determine lift is not critical to the invention. The navigation sensor lift detection system is able to determine lift whether the pointing device is used on a transparent structure or on an opaque structure. Although the navigation sensor lift detection system is able to detect lift when the pointing device is used on a transparent structure, the distance at which lift is able to be detected is greater than the distance that is practical for optical navigation purposes, e.g., less than about 10 mm. That is, lift is not actually detected until the pointing device is lifted more than about 10 mm off the navigation surface. In the embodiment of FIG. 5, the lift status signal generated by the navigation sensor lift detection system is a binary signal that indicates either a lift condition or no lift.

The top surface lift detection processor 176 processes the output signal from an off-chip lift detection detector 180 that is fabricated on a separate substrate 182. The output signal from the off-chip lift detection detector is a function of the intensity of the detected light. The output signal from the lift detection detector is processed by the transparent plate lift detection processor 176 to generate a lift status signal. As depicted in FIG. 5, the lift detection detector may require some conditioning (e.g., amplification) and therefore a signal conditioner 184 may be included between the lift detection detector and the transparent plate lift detection processor. In an embodiment, a lift detection threshold is established (e.g., in terms of current or voltage) and when the lift detection detector 180 output signal drops below the lift detection threshold, the pointing device is determined to be lifted and a corresponding lift status signal is generated and provided to the status logic. In the embodiment of FIG. 5, the transparent plate lift detection processor 176 generates a digital lift status signal. For example, the output is a binary high or low signal, with one of the binary outputs indicating a lift condition and the other of the binary outputs indicating no lift. The top surface lift detection system enables lift to be detected whether the pointing device is located on a transparent structure or on an opaque structure.

The lift status signals from both the top surface lift detection processor 176 and the navigation sensor lift detection system 174 are provided to the status logic 178. The status logic outputs an indication of the lift status to the navigation engine in response to the two received signals. In an embodiment, the status logic is OR logic, in which the output lift status signal indicates a lift condition when either of the two input lift status signals indicates a lift condition. In an embodiment, the top surface lift detection system is used to control lift detection for navigation purposes (e.g., to control when X and Y displacement should be identified as zero to reflect a lift condition) and the navigation sensor lift detection system is used to detect lift in order to control certain components of the navigation system. In one embodiment, the navigation sensor lift detection system is used to determine that the pointing device has been lifted such a large distance above the navigation surface that the user no longer intends to navigate and therefore, certain safety and/or power-saving actions can be taken. For example, the light source can be powered down or turned off when the navigation sensor lift detection system indicates that the pointing device has been lifted.

Figure 6:
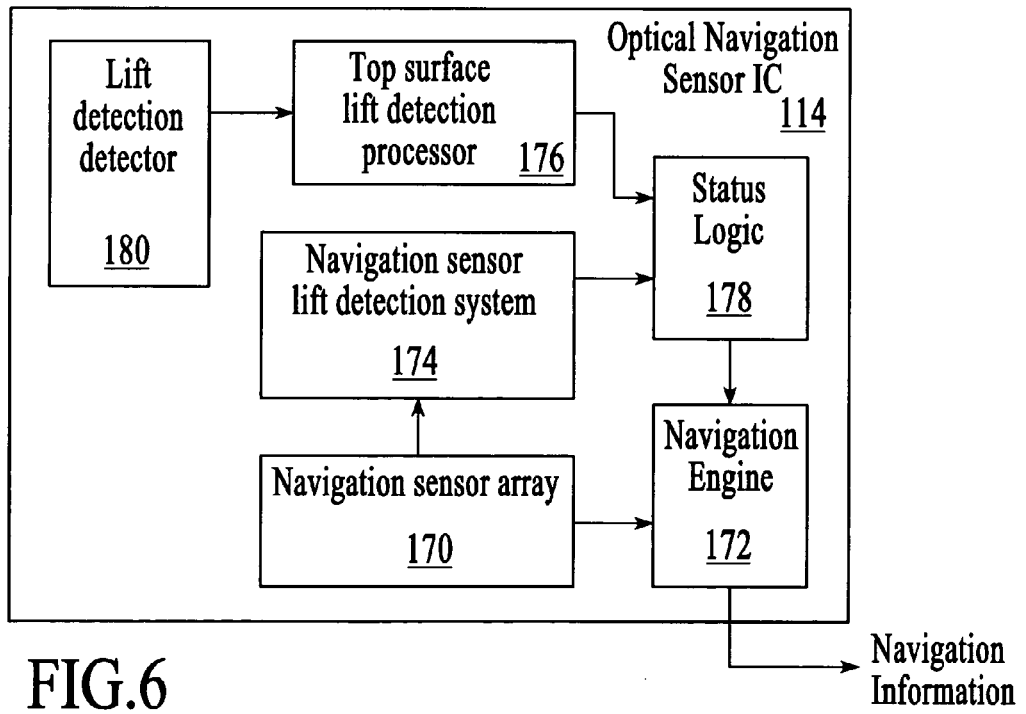
FIG. 6 depicts another embodiment of an optical navigation sensor IC that includes a top surface lift detection system incorporated into the IC.

In the embodiment of FIG. 5, the lift detection detector 180 is located external to the optical navigation sensor IC 114 (e.g., "off-chip"). FIG. 6 depicts an embodiment of an optical navigation sensor IC 114 in which the lift detection detector 180 is incorporated into the IC. The optical navigation sensor IC depicted in FIG. 6 is similar to the optical navigation sensor IC depicted in FIG. 5 except that the lift detection detector is fabricated on the same substrate as the navigation sensor array 170 and the navigation engine. Including the lift detection detector on the optical navigation sensor IC reduces the number of separate devices that are integrated into the pointing device. Additionally, incorporating the lift detection detector into the optical navigation sensor IC can eliminate the need for a signal conditioner.

Although some exemplary embodiments of a pointing device 100 with a top surface lift detection system 140 have been shown and described, other embodiments are possible. In an embodiment, the light source 142 may serve other functions, for example, illuminating the navigation surface for navigation tracking as described with reference to FIGS. 1 and 2.

Although specific embodiments of the invention have been described and illustrated, the invention is not to be limited to the specific forms or arrangements of parts as described and illustrated herein. The invention is limited only by the claims.

What is claimed is:

1. A pointing device comprising:
   an illumination system for generating a beam of light to illuminate a surface upon which the pointing device sits;
   a navigation sensor array configured to generate image information related to an illuminated navigation surface for use in navigation tracking; and
   a top surface lift detection system configured to detect a portion of the beam that reflects off the surface upon which the pointing device sits and to generate a lift status signal in response to the detection, wherein the top surface lift detection system includes a photodetector that is separate from the navigation sensor array and dedicated to lift detection.

2. The pointing device of claim 1 wherein the photodetector is configured and positioned to detect more of the reflected beam when the pointing device sits on the surface than when the pointing device is lifted off the surface.

3. The pointing device of claim 1 further comprising a navigation sensor lift detection system configured to generate a lift status signal in response to the image information.

4. The pointing device of claim 3 wherein the photodetector and the navigation sensor lift detection system are fabricated on the same integrated circuit.

5. The pointing device of claim 3 further comprising status logic configured to receive the lift status signals from the top surface and navigation sensor lift detection systems and to output an indication of the lift status of the pointing device in response to the two lift status signals.

6. The pointing device of claim 5 further comprising a navigation engine configured to receive the indication of the lift status of the pointing device and to output navigation information in response to the image information and the indication of lift status.

7. The pointing device of claim 1 wherein the top surface lift detection system comprises a sensor array that is dedicated to lift detection.

8. The pointing device of claim 7 wherein the sensor array is configured to generate image information and wherein the image information generated from the sensor array is processed to detect lift.

9. The pointing device of claim 1 wherein the top surface lift detection system is utilized for lift detection whether the pointing device sits on a transparent structure or an opaque structure.

10. A pointing device comprising:
    an illumination system for generating a beam of light to illuminate a surface upon which the pointing device sits;
    a navigation sensor array configured to generate image information related to an illuminated navigation surface for use in navigation tracking;
    an navigation sensor lift detection system configured to generate a first lift status signal in response to the image information; and
    a top surface lift detection system configured to detect a portion of the beam that reflects off the surface upon which the pointing device sits and to generate a second lift status signal in response to the detection, wherein the top surface lift detection system includes a photodetector that is separate from the navigation sensor array and dedicated to lift detection.

11. The pointing device of claim 10 wherein the photodetector is configured and positioned to detect more of the reflected beam when the pointing device sits on the surface than when the pointing device is lifted off the surface.

12. The pointing device of claim 10 wherein the top surface lift detection system comprises a sensor array that is dedicated to lift detection.

13. The pointing device of claim 12 wherein the sensor array is configured to generate image information and wherein the image information generated from the sensor array is processed to detect lift.

14. The pointing device of claim 10 further comprising using the first lift status signal to control the illumination system.

15. The pointing device of claim 10 wherein the top surface lift detection system is utilized for lift detection whether the pointing device sits on a transparent structure or an opaque structure.

16. An integrated circuit (IC) for optical navigation, the IC comprising:
    an optical navigation sensor array configured to generate image information related to an illuminated navigation surface for use in navigation tracking within a pointing device;
    an navigation sensor lift detection system configured to generate a first lift status signal in response to the image information;
    a top surface lift detection processor configured to generate a second lift status signal in response to detection of a portion of a beam that reflects off a surface upon which the pointing device sits;
    a navigation engine configured to output navigation information in response to the image information and one of the first and second lift status signals; and
    a lift detection photodetector positioned on the IC to detect light that reflects off the surface upon which the pointing device sits, wherein the lift detection photodetector is separate from the optical navigation sensor array and dedicated to lift detection.

* * * * *